United States Patent
Mueller et al.

(10) Patent No.: US 6,789,767 B2
(45) Date of Patent: Sep. 14, 2004

(54) ACTIVE SATELLITE DISPENSER FOR REUSABLE LAUNCH VEHICLE

(75) Inventors: George E. Mueller, Kirkland, WA (US); David B. Cochran, Bellevue, WA (US); Richard H. Kohrs, Kirkland, WA (US)

(73) Assignee: Kistler Aerospace Corporation, Kirkland, WA (US)

(*) Notice: Subject to any disclaimer, the term of this patent is extended or adjusted under 35 U.S.C. 154(b) by 0 days.

(21) Appl. No.: 10/132,083

(22) Filed: Apr. 23, 2002

(65) Prior Publication Data

US 2002/0179776 A1 Dec. 5, 2002

Related U.S. Application Data

(60) Provisional application No. 60/285,908, filed on Apr. 23, 2001.

(51) Int. Cl.[7] .................................................. B64G 1/64
(52) U.S. Cl. ....................................................... 244/161
(58) Field of Search ............................. 244/158 R, 161

(56) References Cited

U.S. PATENT DOCUMENTS

| | | | |
|---|---|---|---|
| 3,652,042 A | * | 3/1972 | Welther ................... 244/158 R |
| 3,907,225 A | * | 9/1975 | Welther ................... 244/158 R |
| 4,872,625 A | | 10/1989 | Filley |
| 5,178,347 A | | 1/1993 | Johnson et al. |
| 5,199,672 A | | 4/1993 | King et al. |
| 5,242,135 A | | 9/1993 | Scott |
| 5,337,980 A | | 8/1994 | Homer et al. |
| 5,411,226 A | * | 5/1995 | Jones et al. .............. 244/158 R |
| 5,568,901 A | | 10/1996 | Stiennon |
| 5,613,653 A | * | 3/1997 | Bombled et al. ........ 244/158 R |
| 5,678,784 A | | 10/1997 | Marshall, Jr. et al. |
| 5,743,492 A | * | 4/1998 | Chan et al. .............. 244/118.2 |
| 5,806,802 A | | 9/1998 | Scott |
| 5,816,539 A | * | 10/1998 | Chan et al. ................. 244/172 |
| 6,416,018 B2 | * | 7/2002 | DiVerde et al. .......... 244/137.1 |
| 6,513,760 B1 | * | 2/2003 | Mueller et al. ............. 244/172 |

* cited by examiner

Primary Examiner—Peter M. Poon
Assistant Examiner—Timothy D. Collins
(74) Attorney, Agent, or Firm—Davis Wright Tremaine LLP; Michael J. Donohue

(57) ABSTRACT

An active satellite dispenser is preferably attachable to a reusable launch vehicle for deployment of one or more satellites into one or more desired orbits. The active satellite dispenser includes a center mast that releasably receives the satellite(s), a liquid propellant rocket, and an orbital control system on an avionics pallet. In the preferred embodiment, a pressurized gas selectively pressurizes the propellant tanks (which may include fuel and oxidizer tanks), to provide propellant to the rocket. In operation, the launch vehicle releases the satellite dispenser in a first deployment orbit. The active dispenser rocket and orbital control system then transport the active dispenser and satellite(s) into the final deployment orbit. In the preferred embodiment the active dispenser can operate multiple times to place individual satellites in different orbits.

10 Claims, 5 Drawing Sheets

FIG. 5A
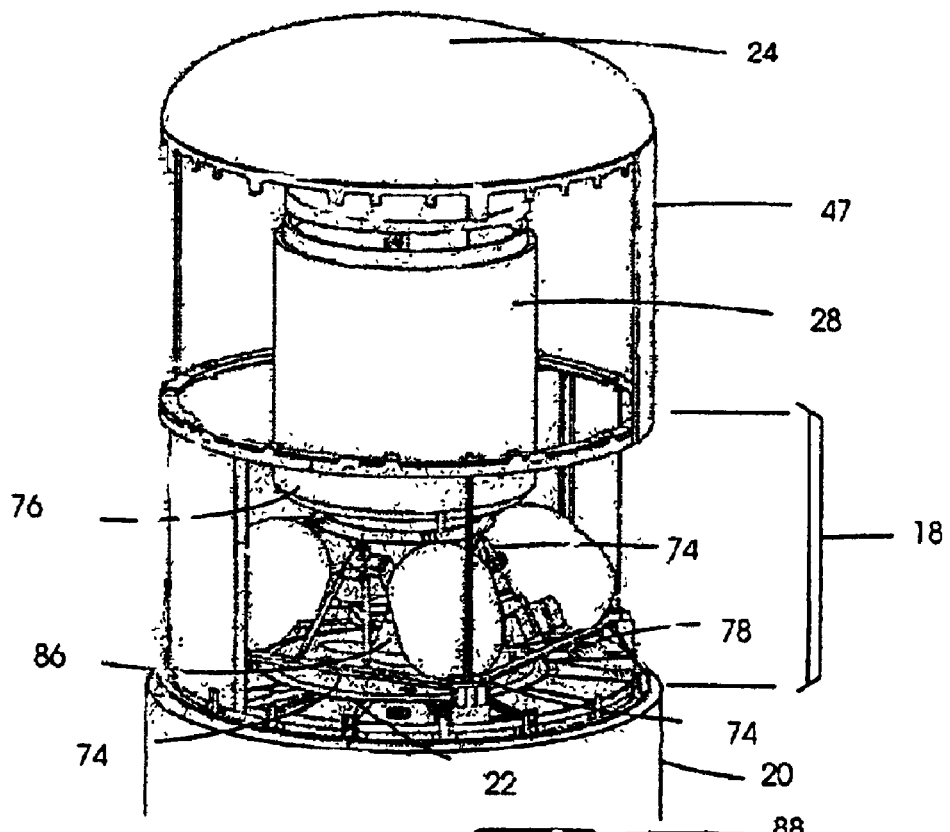
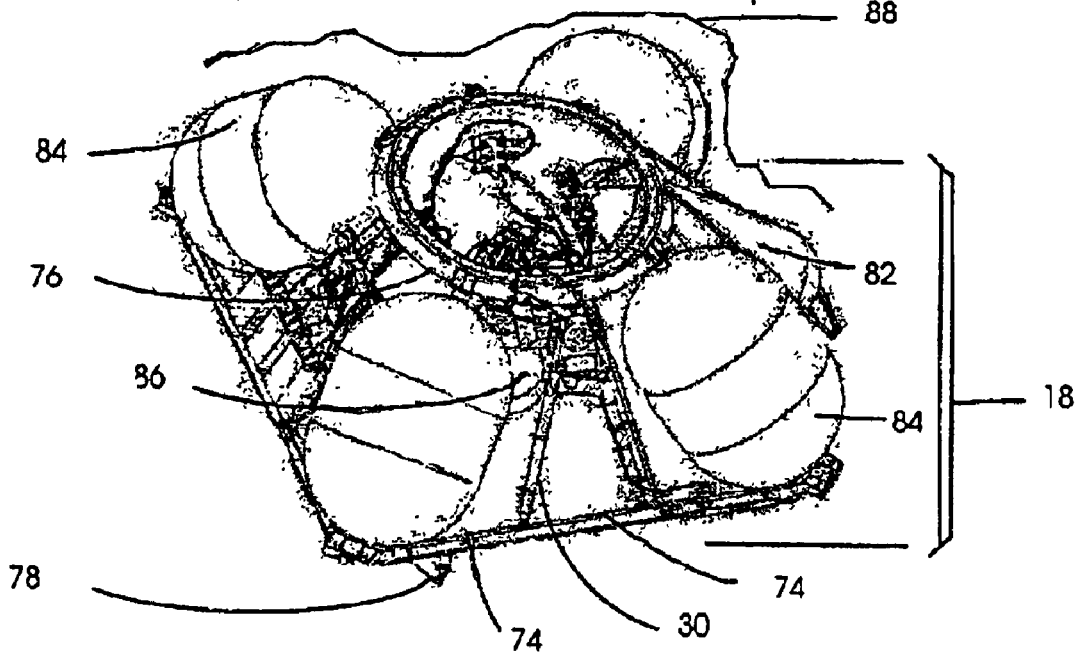
FIG. 5B

ACTIVE SATELLITE DISPENSER FOR REUSABLE LAUNCH VEHICLE

CROSS-REFERENCE TO RELATED APPLICATION

This application claims the benefit of U.S. Provisional Patent Application No. 60/285,908, filed Apr. 23, 2001, the benefit of which is hereby claimed under 35 U.S.C. §119.

FIELD OF THE INVENTION

The present invention relates to hardware for the launch, transportation, transfer, and release of satellites, cargo, and other payloads in earth orbit. More particularly, the present invention relates to a satellite dispenser providing propulsion and avionics systems for the controlled release of multiple satellites

BACKGROUND OF THE INVENTION

The transportation of cargo to space is expensive. The high cost is partially attributable to the aggregation of multiple, costly individual operations that are needed to transport and deploy satellites and other cargo to orbit. The latter part of the orbital transportation operation, i.e., transporting the payload from low earth orbit to the desired final higher orbit, is typically accomplished by an upper, or final, stage. This stage is ignited and transports the payload to the final orbit. Sometimes this stage remains attached to the payload, satellite, or cargo; but it is usually discarded in orbit. Upper stages vary in their capability of independent actions from a passive, simple, small, solid rocket motor just providing additional propulsion capability, which goes in the direction it is pointed when ignited, to very capable, restartable, liquid rocket engines capable of multiple restarts and significant maneuvering using thruster(s) and related avionics. Some active upper stages are able to dispense multiple satellites.

Launch vehicles used to deploy satellites in a predetermined orbit are evolving from expendable, and partially expendable rockets, toward fully reusable launch vehicles (RLVs) capable of multiple reuse. The primary advantage of RLVs is the potential for significant cost savings. RLVs frequently utilize active satellite dispensers and upper stages. Satellite launch systems still include a device that couples the satellite to the launch vehicle; but in today's world, this dispensing hardware takes on a more active role than the simple release of the satellite in response to a control signal. Recent reusable vehicle advances, technological improvements, and commercial market forces are moving the satellite industry toward smaller, more sophisticated commercial networks of communications satellites requiring multiple satellites in various orbital planes around earth.

The increased demand for communication satellite networks and higher orbits has given rise to active, more capable, customer-sensitive satellite dispensers that satisfy the new privately-financed communication network markets. The new commercial networks require innovative satellites of different size, weight, and transportation requirements. Existing satellite dispensers lack the flexibility and cost effectiveness of reusable vehicles. Moreover, existing satellite dispensers lack subsystem commonality, propellant compatibility, and/or the ability to adapt to the emerging reusable launch vehicles. Existing satellite dispensers fail to adequately take advantage of the reusable vehicles' reusable shrouds and orbital satellite release techniques.

Previous dispensers stack multiple satellites vertically, and therefore typically employ discardable shrouds that can clutter the orbital environment with spent hardware, which can endanger other space operations. Shortly, international agreements are expected to limit the placement of satellites to those systems that minimize the debris impact on others.

U.S. Pat. No. 5,568,901 to Stiennon, entitled "Two Stage Launch Vehicle and Launch Trajectory Method," is purported to be a fully reusable launch vehicle, but fails to mention anything of a satellite dispenser.

The space shuttle is a partly-reusable vehicle and has several expendable satellite assist modules, or third stages, but at significant cost and requiring extensive hardware dispensers specific to the shuttle payload bay and, in some cases, requiring the changing of the axial orientation of the satellite by a significant amount or to exit the payload bay via a Frisbee®-throwing method.

U.S. Pat. No. 5,242,135 to Scott et al., entitled "space Transfer Vehicle and Integrated Guidance System," is a space transfer system capable of continuing the propulsive cycle of earlier stages, but lacks the full service structure system to handle the new generation of communications satellites. No provision for both forward and sideways satellite ejection appears to be available from this patent. No shroud reuse or any reuse of any hardware, except the space transfer vehicle, is implied. No provision in the hardware is evident for disposal at end of life.

U.S. Pat. No. 5,884,866 to Steinmeyer et al., entitled "Satellite Dispenser," is a dispenser for the 1990s, but has no propulsion or other active subsystems. The post can accommodate the newer network communication satellites, but it appears the entire upper stage of the poorly defined launch vehicle must be taken to each individual orbit for satellite dispensing.

U.S. Pat. No. 5,337,980 to Homer et al., entitled "Spacecraft-to-Launch-Vehicle Transition," is more a structural connection between a vehicle and a satellite, rather than a dispenser. The drawings seem to depict a rocket engine, but it appears to be a part of the satellite. The adapter and/or structural hardware appears to have no active dispensing function except a release capability.

U.S. Pat. No. 5,199,672 to King et al., entitled "Method and Apparatus for Deploying a Satellite," is a solid rocket version of a dispenser designed to place many small satellites into a specific orbital plane and focuses on the specific design to accommodate the Pegasus. The four separate pallets are fired into different orbital planes by waiting to fire the solid rocket motors at different times as the earth turns below.

U.S. Pat. No. 5,816,539 to Stotelmeyer et al., entitled "Integrated Storage and Transfer System and Method for Spacecraft Propulsion Systems," is an orbital assist module (OAM) built into the stack of an expendable launch vehicle (ELV). The orbital assist module propellant comprises hydrazine and is difficult to handle.

In contrast, the present invention uses propellants, preferably liquid propellants, used in a single, pressure-feed engine that preferably utilizes components having commonality with the reusable launch vehicle. This hardware commonality in engine, main propellants, pressurants, radiation-hardened avionics, and attitude control systems (ACS), including the propellant used in the ACS tanks, reduces the testing, procurement, ground handling, support systems, and—most importantly—the cost. The propellants used also lend themselves to increased ground safety and cost-effective operations within the present invention.

Although the present invention will be described with reference to a preferred embodiment that is designed to be used with the K-1 reusable launch vehicle system, which includes a launch assist platform and an orbital vehicle (hereinafter, the K-1 orbital vehicle, or the like) currently under development by Kistler Aerospace Corporation, it will be appreciated by one of ordinary skill in the art that the invention can be readily adapted for use with other launch systems without departing from the spirit and scope of the disclosed invention.

SUMMARY OF THE INVENTION

A primary object of the active dispenser is to transfer the satellite to a higher orbit and position it in the proper orbital location in a cost-effective manner.

An advantage of the present invention is the cost-effective combination of a reusable launch vehicle subsystem, including efficient propulsion subsystems, pre-engineered common computer avionics, propellant, pressurant, and attitude control thruster hardware subsystems, and a dispenser for multiple satellites.

An advantage of the active dispenser on a reusable launch vehicle is the ability to integrate commonality with subsystems used on the launch vehicle and/or satellite hardware providing cost-effective common subsystems through commonality in design, procurement, testing, and propellant loading.

Another advantage of the invention is the ability to integrate common ground handling techniques, technical maintenance, financing, and ownership of the active dispenser, launch vehicle, and satellites.

Another advantage of the invention is an integrated commercial, satellite delivery operation that all works together in a cohesive manner to accomplish the ground processing, launch, transfer to the proper orbit, release of the satellite, and potential follow-on support.

Another advantage of the active dispenser is an integrated design, flexible enough to be capable of accommodating on a general active dispenser, a number of different satellites from numerous organizations with varying requirements, different weights, various final orbits, different ground processing requirements, and varying financial needs.

Another advantage of the invention is the increased energy efficiency in the use of liquid propellants, including the liquid storable propellants, the decreased cost in simplifying the ground handling by using the storable propellants, increased flexibility from the restartable orbital propulsion, and the increased reliability and simplified handling from the common, pre-tested hardware and propellant systems.

Another advantage of the invention is a single, pressure-fed, restartable, liquid bipropellant main engine located at the base of the active dispenser, which fires to propel the active dispenser into its proper orbit.

Another advantage of the active dispenser is a reusable, conical payload adapter at the base of the dispenser and a clampband that attaches the K-1 vehicle or other vehicles to the active dispenser.

Another advantage of the invention is the K-1 orbiter or other launch vehicle, which opens its payload module dome in orbit and deploys either vertically or horizontally everything above the clampband into space.

Another advantage of the invention includes the various satellites with different shapes that are able to be attached to the support mast using adaptable structural interfaces.

Another advantage of the invention is the small thrusters mounted to the active dispenser used for attitude control, a pallet for avionics hardware, and gas storage bottles for pressurization and attitude control.

Another advantage of the invention includes two similar tanks (one or more for fuel and one or more for oxidizer) mounted on either side of the support mast, which connects the engine to the propellant via feed lines.

Another advantage of the invention is the propulsion system design using hardware common to the K-1.

Another advantage of the invention is that the propellant tanks are pressurized by gas storage bottles filled with pressurant gas.

Another advantage of the invention is an active dispenser avionics system, which uses the radiation-hardened hardware for control as the K-1 orbital vehicle.

Another advantage of the invention is the avionics system, which uses a triplex computing architecture with three cross-strapped 1553 avionics databases and a hardware voter.

Another advantage of the invention is the electronics power, which is triply redundant, and the utility power, which is dual redundant.

Another advantage of the invention is the flight software, which is a modified version of the software used on the K-1 orbital vehicle.

Another advantage of the active dispenser, in a nominal mission mated with one or more customer satellites, is its being processed, handled, fueled, and mated to the K-1 payload module in the K-1 payload processing facility, using the same hardware, consumables, and staff already on hand for other similar hardware on the existing reusable launch vehicles.

Another advantage of the invention is that the orbital vehicle deploys the active dispenser and satellites after it reaches a nominal 200 km circular orbit at the desired inclination, depending on the mission.

Another advantage of the invention is achieved after adequate clearance between the active dispenser and orbital vehicle is achieved and the active dispenser performs a series of burns used to place the satellites into their desired final orbits, without further assistance form the launch vehicle.

The active dispenser places satellites into higher orbits than the host launch vehicle. This third stage is cost-effective because it combines the advantages of a reusable launch vehicle with the flexibility and common subsystems.

In a nominal mission, the active dispenser is mated with the customer's satellite in an off-line vehicle processing operation, including propellant loading, and mated to the K-1 payload module in the K-1 payload processing facility. The launch vehicle deploys the active dispenser and satellites after it reaches a higher circular orbit at the desired orbital inclination. The active dispenser initiates a series of burns to place the satellites into their desired final orbits.

Other objects, advantages, and novel features, and further scope of applicability will be set forth in part in the detailed description to follow, taken in conjunction with the accompanying drawings, FIGS. 1–5, and, in part, will become apparent to those skilled in the art upon examination of the following, or may be learned by practice of the invention. The objects and advantages of the invention may be realized and attained by means of the inventions particularly pointed out in the appended claims.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The active dispenser relates to enhance existing and emerging reusable launch vehicle (RLV) technology and its use in the satellite transportation industry. The present invention provides a more cost-effective transportation cycle capable of placing cargo into orbits beyond the capability of typical existing RLVs or expendable launch vehicle.

Figure 1:
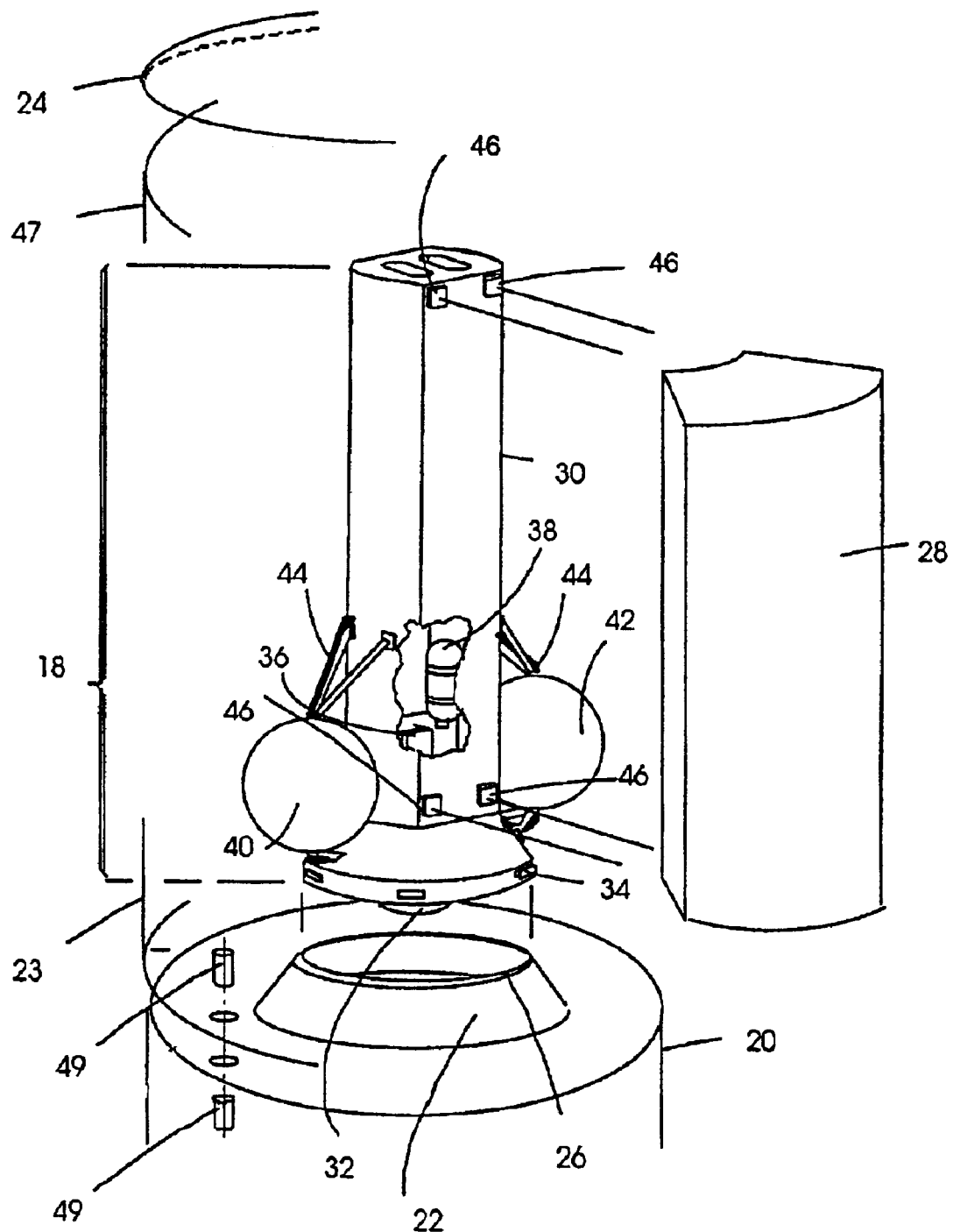
FIG. 1 is the active dispenser.

Reference is now made to FIG. 1, which illustrates a preferred embodiment of the invention. FIG. 1 is a side view of an active satellite dispenser 18 for transporting satellites, payloads, or cargo to space. A launch vehicle—for example the K-1 reusable launch vehicle 20—is attached at the bottom of the active dispenser 18. It is contemplated that the launch vehicle may be a single-stage rocket vehicle, a two-stage launch vehicle, or multi-stage space vehicle, and may be either expendable after launch or reusable on future launches. A conical payload adapter 22 is used to attach the active dispenser 18 to the K-1 orbital vehicle 20. A clamp-band 26—a device capable of structurally connecting active dispenser 18 to conical payload adapter 22 and capable of being released upon command—is shown.

The active dispenser 18 includes a structural frame or support mast 30, at least one engine 32, a plurality of attitude control system thrusters 34, a pallet of avionics hardware 36, pressurized gas storage bottles 38, one or more tanks for fuel 40, one or more tanks for liquid propellant 42 (i.e., oxidant), and feed lines 44. The structural frame or support mast 30 of the preferred embodiment is a box-shaped, metal or composite support member for the attachment of one or more satellites 28. In the disclosed configuration, the pallet of avionics hardware 36 and the gas storage bottles 38 are located inside the box of support mast 30. FIG. 1 depicts a support mast 30 for two satellites 28 of a long, narrow configuration and requiring an extended payload module 47 (shown in fragmentary view in FIG. 1 and more completely in other figures). The extended payload module 47 preferably provides approximately 17 feet inside height. Other customer satellites may require other support structure configurations and may, for example, permit the use of only a shorter payload module 23, for example, providing approximately 9 feet inside height.

Figure 3:
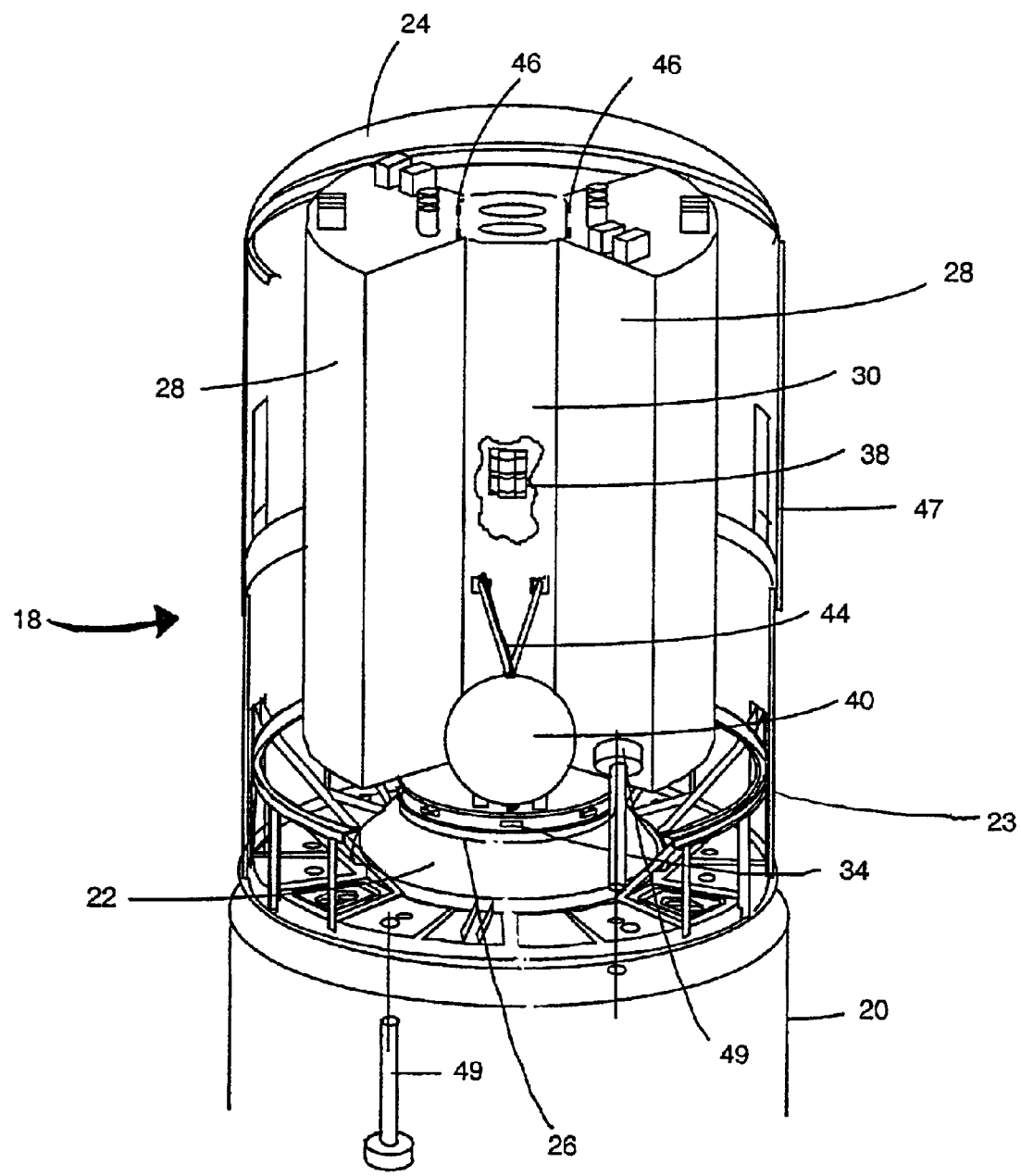
FIG. 3 is the active dispenser attached to the Kistler K-1 reusable launch vehicle.

The active dispenser 18 may use either the shorter payload module 23 alone or with the extended payload module 47 (both shown in more detail in FIGS. 3 and 5). The payload modules 23, 47 provide ascent and re-entry protection. The shorter payload module 23 and/or the extended payload module 47 are covered by a payload module dome 24, that cooperatively with the other components defines a protected enclosed volume that offers protection during flight and on the ground after the installation of the satellite 28 or other payloads. This complete payload module with satellite 28, or other payload, is attached and detached from the launch vehicle or K-1 orbital vehicle 20 by payload module attachment bolts 49 between the payload module 18 and the orbital vehicle 20. This "quick bolt-on" of the closed volume unit permits the user to decouple the entire customer payload preparation operation from the transportation space launch K-1 orbital vehicle 20. This compartmentalizing function provides the ability to store the payload and/or satellite 28 in a payload module for extended periods of time apart from the launch vehicle 20 increasing the flexibility of the launch system. This is a departure from the traditional time-consuming method of stacking the payload on the launch vehicle while the assembly is on the launch pad and the integration procedures used in the space transportation system industry. The payload module 23 or extended payload module 47, with the payload module dome 24, is mated or integrated with the active dispenser 18 in a separate ground processing location and separate timeline from the ground processing of K-1 orbital vehicle 20.

It is contemplated that the active dispenser 18 will use, as much as possible, the pre-tested and cost effective subsystems of K-1 orbital vehicle 20, or other host vehicle subsystems or, in some cases, subsystems from the satellite 28, given satellite 28 requirements—including structural frame or support mast 30, engine 32, attitude control system thrusters 34, pallet of avionics hardware 36, gas storage bottles 38, tank for fuel 40, tank for liquid propellants 42, and feed lines 44.

The main propulsion of the active dispenser 18 is preferably a single, restartable, liquid bipropellant rocket engine 32 located at the base of active dispenser 18. The rocket engine 32 propels the active dispenser 18 using liquid propellants from tank for fuel 40, tank for liquid propellants 42, and feed lines 44 from each tank 40, 42 to the engine 32, in order to place the active dispenser 18 with satellites 28 into the desired deployment orbit (see FIG. 4). The avionics pallet 36 and gas storage bottles 38, and some other items, are mounted inside support mast 30 for additional protection. The avionics pallet 36 controls the smaller attitude controls system thrusters 34 of the active dispenser 18. One or more tanks for fuel 40 and one or more tanks for liquid propellants 42 are located on either side of the support mast 30, and feed lines 44 from each tank to the engine 32 are provided to connect propellant to the engine 32. Liquid propellant is forced or pressure-fed through the feed lines 44 using pressurized gas from gas storage bottles 38. The satellite(s) 28 are connected to support mast 30 via satellite interfaces 46.

Figure 4:
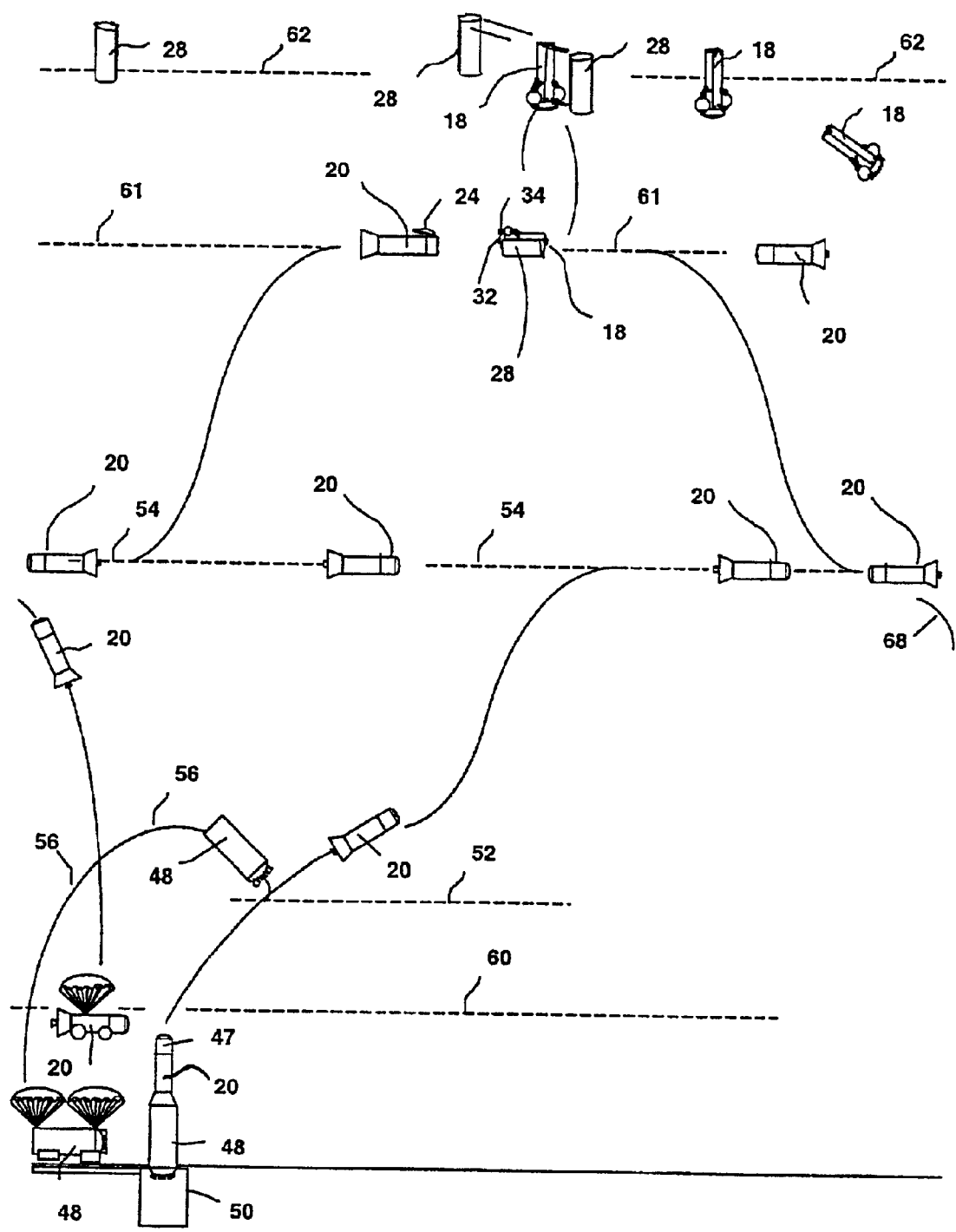
FIG. 4 is the mission profile for the active dispenser.

It should be appreciated that upon deployment the active dispenser 18 and satellite(s) 28 are released from the payload module 23 and/or extended payload module 47. It is contemplated, as shown in FIG. 4 and discussed below, that the payload module 23, 47 in the preferred embodiment, will then return to earth for reuse. This is an improvement over prior art systems wherein a shroud or similar payload enclosure typically is released in orbit to burn up on reentry.

Figure 2:
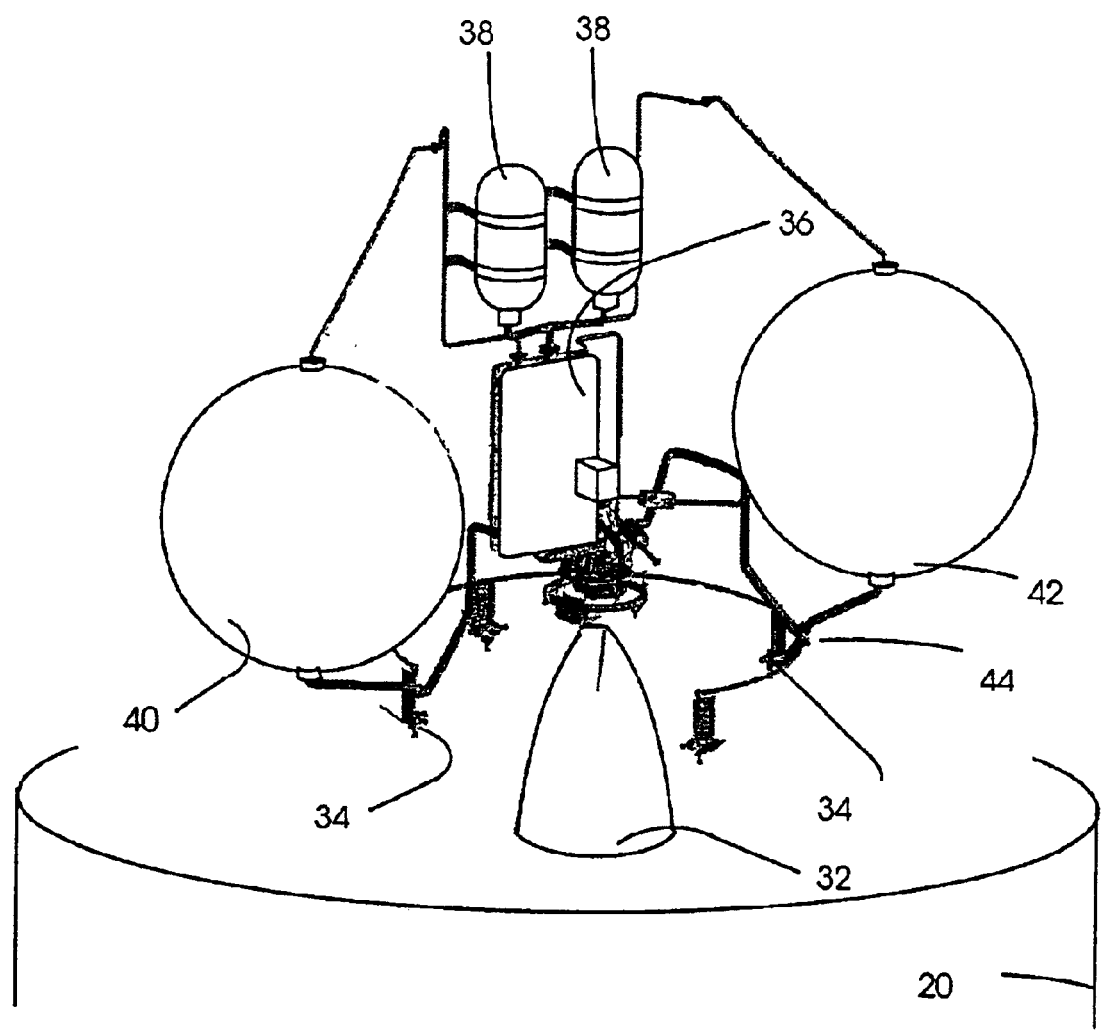
FIG. 2 is the active dispenser propulsion system.

FIG. 2 depicts a close-up of a preferred subsystem layout within the active dispenser 18 with the support mast 30 removed for clarity, and some other support items shown. The avionics pallet 36 is derived from the K-1 orbital vehicle 20 avionics and controls the other components of the active dispenser 18. It will be appreciated that the active dispenser 18 can be used on vehicles other than the K-1 orbital vehicle 20.

The avionics pallet 36 controls the gas storage bottles 38, preferably by controlling a valve to selectively release the high pressure gas into the tank for fuel 40 and the tank for liquid propellants 42, forcing liquid propellant through feed lines 44 to the engine 32. The avionics pallet 36 also controls other subsystems, such as attitude control system thrusters 34. It should be apparent that many of the components, such as pallet of avionics hardware 36, gas storage bottles 38, and the feed lines 44, are protected by support mast 30.

FIG. 3 depicts the active dispenser 18 in the payload module 23, with the extended payload module 47. In orbit, the payload module dome 24 is released and moved or positioned out of the satellite 28 deployment path, which may be either sideways or forward. In the preferred embodiment, the payload module dome 24 opening operation occurs at active dispenser 18 deployment orbit 61 (see FIG. 4). This provides advantages over the convention exposure of the satellite during ejection of the shroud or nose covering altitude on the ascent of prior art launch vehicles. This later payload module dome 24 opening operation affords more protection for the satellite(s) 28.

In the preferred embodiment, the active dispenser 18 is connected to a conical payload adapter 22 with a clampband 26, which is adapted to release the active dispenser 18 at a specified time in orbit, and with one or more (one shown) releasable attachment bolts 49. At the desired time, the clampband 26 and the payload module attachment bolts 49 that attach the payload module 23 to the K-1 orbital vehicle 20 release the active dispenser with the satellite. It will be appreciated that, before launch, the high-pressure gases and liquid propellants are loaded into the tank for fuel 40, tank for liquid propellants 42, and gas storage bottles 38. The feed lines 44 provide fluid flow paths generally to and/or from the tank for fuel 40, tank for liquid propellants 42, and gas storage bottles 38 to supply the rocket engine 32 (hidden, but shown in FIG. 2) with propellant. The attitude control system thrusters 34 are used to stabilize the active dispenser 18 after the separation from the conical payload adapter 22 until separation of the satellite 28. The satellite(s) 28 are preferably connected to the support mast 30 through any conventional interface 46, as are well known in the art.

FIG. 4 depicts the typical mission profile for the active dispenser 18 inside K-1 orbital vehicle 20, showing the orbital vehicle 20 and the active dispenser 18 at various sequential stages of deployment. The typical mission profile for the active dispenser 18 inside an alternative launch vehicle may vary slightly from that shown in FIG. 4. The transportation cycle typically starts with a satellite owner contracting with a launch vehicle operator or transportation provider. The satellite 28 and orbital vehicle 20 requirements are exchanged and agreed to by the parties. The satellite 28 then arrives at spaceport 50, and is put into storage, if required. The satellite 28 is then integrated with the active dispenser and then attached to the K-1 orbital vehicle 20. Alternatively, the satellite owner may provide the satellite pre-integrated with the active dispenser 18 and ready for attachment to the K-1 orbital vehicle 20.

In the preferred embodiment, the K-1 launch assist platform 48 launches with K-1 orbital vehicle 20 attached, including the active dispenser 18 and satellite(s) 28 from spaceport 50.

The two-stage, K-1 launch assist platform 48 achieves a predetermined trajectory and the entire vehicle moves to stage separation altitude 52, where the K-1 orbital vehicle 20 separates from the K-1 launch assist platform 48. The K-1 orbital vehicle 20 with active dispenser 18 and satellite(s) 28 proceeds to the main engine cut-off (MECO) altitude 54. The K-1 orbital vehicle 20 then proceeds to the payload deployment altitude 61. The payload module dome 24 is opened and the active dispenser 18 and satellite 28 are separated from K-1 orbital vehicle 20.

The K-1 launch assist platform 48 cuts its main engines, separates, reverses direction, and restarts its center engine for the return journey back to the original launch site in spaceport 50. The K-1 launch assist platform 48 re-enters the atmosphere on flyback trajectory 56, deploys parachutes at parachute deployment altitude 60, and lands on air bags near the original launch site, ready for several weeks of refurbishment work to permit its reuse for a later launch.

The K-1 orbital vehicle 20 with the active dispenser 18 and the satellite(s) 28 proceeds to a typically circular orbit at a desired inclination. The K-1 orbital vehicle 20 deploys the active dispenser 18 and satellite(s) 28 after attaining a desired nominal orbit, e.g., 200 km circular orbit, at the desired inclination, which is the active dispenser deployment orbit 62. After adequate clearance is achieved between active dispenser 18 and K-1 orbital vehicle 20, the active dispenser 18 initiates a series of burns using the rocket engine 32 to place the customer's satellite 28 into its desired final orbit. The attitude of the active dispenser 18 may be adjusted by the attitude control system thrusters 34, whereby the satellite is placed in the desired orbit and orientation for deployment of the satellite(s) 28. If multiple satellites are on-board, then the rocket engine 32 and attitude control system thrusters 34 may be used to place the additional satellites 28 in somewhat different orbits. In the preferred embodiment, the K-1 orbital vehicle 20 proceeds to an orbiter-phasing altitude and waits until the earth rotates back to a location permitting the K-1 orbital vehicle 20 to enter a desired re-entry 68 path and return to the original spaceport 50 or another spaceport.

Figure 5A:
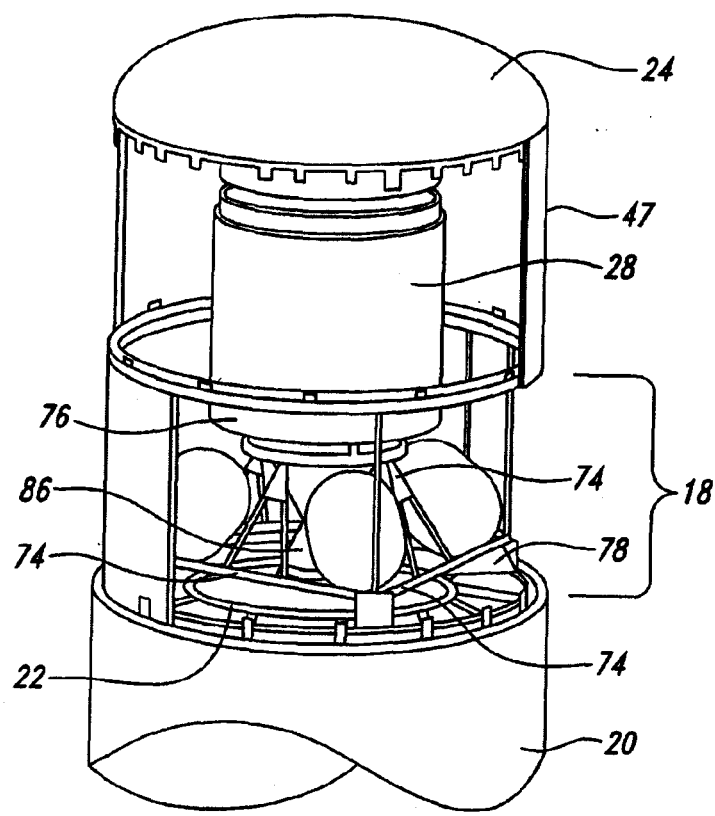
FIGS. 5A and 5B are second configurations of the active dispenser designed to launch a different satellite.
Figure 5B:
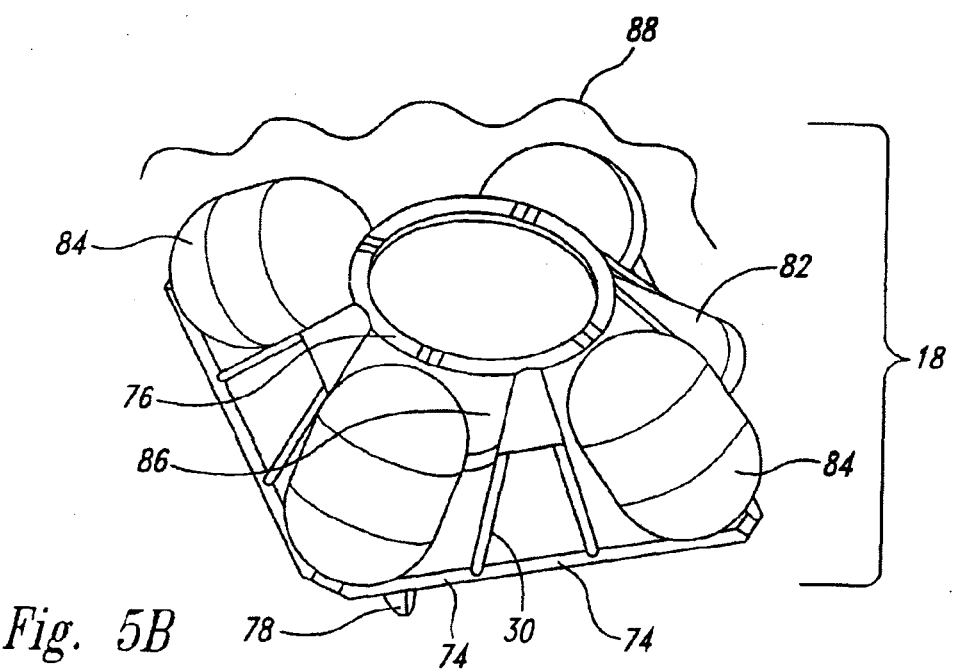

FIGS. 5A and 5B depict another configuration of the active dispenser 18' using less host vehicle subsystems and more of the satellite 28' subsystems, and requiring more payload weight launch. The active dispenser 18' preferably still uses the K-1 orbital vehicle 20 as the host vehicle, but the active dispenser 18' configuration changes structural, propellants, and weight capability to accommodate different satellite(s) 28'.

With a differently-shaped satellite 28', active dispenser 18' evolves into a different structure for support mast 30' and a different solution for conical payload adapter 22' by changing the structure to a square structure frame with stabilization struts 74 and thrust cone and spacecraft adapter interface ring 76 due to the requirements of a different shape and type of satellite 28'. The square structure frame with stabilization struts supports a large communication satellite within extended payload module 47 from the bottom structural interfaces or payload module interface at the bottom of extended payload module 47 to thrust cone and spacecraft adapter interface ring 76, which supports satellite 28. Also supported on the square structure frame with stabilization struts 74, are ACS thruster mounts 78, helium pressure bottle 82, main propellant tank 84, and an engine 86. The active dispenser 18' is protected by multiple layer aluminized Mylar heat shield 88, partly shown in FIG. 5, and opening and closing payload module dome 24.

The preceding examples are repeated with similar success by substituting the generically- or specifically described reactants and/or operating conditions of this invention for those used in the preceding examples.

While the preferred embodiment of the invention has been illustrated and described, it will be appreciated that various changes can be made therein without departing from the spirit and scope of the invention.

What is claimed is:
1. An active satellite dispenser for deploying at least one satellite in orbit, the active dispenser being attachable to a launch vehicle and disposed within a cylindrical payload module attached to the launch vehicle, the active dispenser comprising:

an elongate center mast having a lower end and an upper end, and a longitudinally extending surface between the upper and lower ends the mast defining an interior volume, the mast further having a plurality of exterior connectors on the longitudinal surface adapted to engage the at least one satellite and thereby position the at least one satellite adjacent to the longitudinally extending surface;

a rocket engine disposed at the lower end of the mast;

at least one pressurized tank disposed in the interior volume of the mast;

at least one propellant tank disposed adjacent the center mast, the propellant tank being selectively, fluidly connected to the pressurized tank such that the propellant tank can be pressurized, the propellant tank further being fluidly connected to the rocket engine; and an avionics pallet having an orbital control system, and that can selectively fluidly connect the pressurized tank to the propellant tank.

2. The active satellite dispenser of claim 1, further comprising an attitude control system including a plurality of attitude control thrusters.

3. The active satellite dispenser of claim 1, further comprising a clampband for releasably coupling the active satellite dispenser to the launch vehicle.

4. The active satellite dispenser of claim 1, wherein the payload module includes a payload dome that is openable in orbit.

5. The active satellite dispenser of claim 1, wherein the active dispenser is adapted to engage a plurality of satellites.

6. The active satellite dispenser of claim 2, wherein the rocket and the orbital control system are adapted to move the satellite dispenser from a first orbit to a second orbit, wherein the second orbit is a desired satellite deployment orbit.

7. The active satellite dispenser of claim 6, wherein the rocket and the orbital control system are adapted to further move the satellite dispenser from the second orbit to a third orbit, wherein the third orbit is also a desired satellite deployment orbit.

8. The active satellite dispenser of claim 1, wherein the at least one pressurized tank comprises a helium tank.

9. A method for deploying a plurality of satellites in orbit comprising:

(a) releasably attaching the satellites releasably attaching the satellites via a connector on a longitudinally extending surface of a center mast portion of an active satellite dispenser having a liquid propellant engine and an orbital control system;

(b) releasably attaching the active satellite dispenser to a launch vehicle such that the satellites are enclosed in a payload module;

(c) using the launch vehicle to place the satellites in a payload deployment orbit;

(d) releasing the active satellite dispenser from the launch vehicle;

(e) using the active satellite dispenser rocket engine and orbital control system to move the satellites into an active dispenser deployment orbit; and (f) releasing at least one of the plurality of satellites from the active satellite dispenser.

10. The method of claim 9, further comprising:

(g) using the active satellite dispenser rocket engine and orbital control system to move a satellite into a second active dispenser deployment orbit; and (h) releasing at least one of the plurality of satellites from the active satellite dispenser in the second active dispenser deployment orbit.

* * * * *

UNITED STATES PATENT AND TRADEMARK OFFICE
CERTIFICATE OF CORRECTION

PATENT NO. : 6,789,767 B2
DATED : September 14, 2004
INVENTOR(S) : George E. Mueller et al.

It is certified that error appears in the above-identified patent and that said Letters Patent is hereby corrected as shown below:

Drawing sheet, consisting of Fig. 5A thru Fig. 5B, should be deleted and replaced with the drawing sheet, consisting of Fig. 5A thru Fig. 5B, as shown on the attached page.

Signed and Sealed this

Twenty-third Day of August, 2005

JON W. DUDAS
*Director of the United States Patent and Trademark Office*